US007922048B2

(12) United States Patent
Smith et al.

(10) Patent No.: US 7,922,048 B2
(45) Date of Patent: Apr. 12, 2011

(54) INTEGRATED SPARE TIRE CARRIER

(75) Inventors: Stephen M. Smith, Madison Heights, MI (US); Theron Shaw, Waterford, MI (US); Christopher J. Duke, White Lake, MI (US); Terence P. Grace, Bloomfield Hills, MI (US); Michael R. Uhlmeyer, Lake Orion, MI (US); Stephen D. Logan, Northville, MI (US); David M. Langer, Warren, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 970 days.

(21) Appl. No.: 11/763,675

(22) Filed: Jun. 15, 2007

(65) Prior Publication Data

US 2008/0308588 A1 Dec. 18, 2008

(51) Int. Cl.
*B62D 43/00* (2006.01)
*B60R 19/48* (2006.01)

(52) U.S. Cl. ............... 224/42.24; 224/42.25; 224/42.23; 224/42.26; 224/42.14; 224/42.12; 296/37.2; 293/117

(58) Field of Classification Search ............... 224/42.24, 224/42.25, 42.23, 42.26, 42.28, 42.14, 42.21, 224/42.12; 296/37.2; 293/117
See application file for complete search history.

(56) References Cited

U.S. PATENT DOCUMENTS

| | | | | |
|---|---|---|---|---|
| 2,775,358 A | * | 12/1956 | Renouf | 414/463 |
| 4,387,837 A | * | 6/1983 | Carr et al. | 224/42.21 |
| 4,485,945 A | * | 12/1984 | Ankeny | 224/504 |
| 4,717,054 A | * | 1/1988 | Vanzant | 224/42.21 |
| 4,718,582 A | * | 1/1988 | Iovenitti | 224/42.21 |
| 4,873,851 A | * | 10/1989 | Arnett | 70/259 |
| 5,060,912 A | | 10/1991 | Guarr | |
| 5,085,360 A | * | 2/1992 | Fortune et al. | 224/42.13 |
| 5,137,192 A | | 8/1992 | Sheridan et al. | |
| 5,303,569 A | * | 4/1994 | Wright | 70/259 |
| 6,116,483 A | | 9/2000 | MacKarvich | |
| 6,749,094 B1 | | 6/2004 | Dexel | |
| 6,761,293 B2 | | 7/2004 | Vasseur | |
| 6,871,841 B2 | | 3/2005 | Brestelli et al. | |
| 6,910,669 B2 | | 6/2005 | Gates et al. | |
| 6,923,351 B2 | * | 8/2005 | Roehmer et al. | 224/42.21 |
| 6,962,369 B2 | * | 11/2005 | Hellums | 280/767 |
| 7,028,989 B2 | | 4/2006 | Flynn et al. | |

* cited by examiner

*Primary Examiner* — Nathan J Newhouse
*Assistant Examiner* — Lester L Vanterpool
(74) *Attorney, Agent, or Firm* — Ralph E. Smith

(57) ABSTRACT

A spare tire carrier for a vehicle may structurally entail a base, a mounting flange extending from the base, a vertical support post extending from the base, a light support post attached to the vertical support post, a threaded stud that engages a front surface of the base to support a spare tire. A tether, which may be secured to the base with a fastener, may lie largely concealed within the base and have additional studs or bolts which may protrude through a front surface of the base and further support a spare tire. A plurality of strength ribs may join the mounting flange and the base, while the base, the first mounting flange, vertical support post extending from the base, and plurality of strength ribs may be a single cast magnesium part. The tether may be of another high strength material.

14 Claims, 6 Drawing Sheets

INTEGRATED SPARE TIRE CARRIER

FIELD

The present invention relates to a spare tire carrier for a vehicle.

BACKGROUND

Historically, some vehicles have successfully stored a spare tire on the exterior surface of the vehicle, and in so doing, desirable interior cargo space is preserved. While such exterior spare tire carriers have generally proven satisfactory for their given application, each is associated with its share of limitations. One such limitation of current spare tire carriers is that they are currently made of materials that are prone to rusting because of exposure to the elements. Another limitation of current spare tire carriers is that they are assembled from a high number of parts and a high number of fasteners, thus increasing tire carrier assembly time. Another limitation of current spare tire carriers is that because they are typically stamped from sheet steel or thin plate before bending and assembly, there is a considerable amount of waste from trimming of the pieces, which is necessary to arrive at their final part shape. Still yet another limitation of current spare tire carriers is that because they are typically stamped from steel sheet or thin plate, they tend to be relatively heavy while the addition of numerous fasteners compounds the problem of weight.

To illustrate the problems mentioned above, a prior art spare tire carrier 10 as depicted in FIG. 1, will be further described. The spare tire carrier 10, is an assembly of a frame 12, which bolts to a vehicle outer body. The frame 12 is a stamped, and then formed, steel part that has multiple flanges 14, 16 bent from it to accommodate mounting on the vehicle outer body. A further flange 18 is bent into the frame 12 to accommodate additional parts such as an outer plate 20 and an intermediate plate 22. The stamped, steel intermediate plate 22 is held against the stamped, steel outer plate 20 which are then bolted onto the frame 12 using fasteners 24, 26. A third fastener 28 is passed through the plates 20, 22 to secure a wheel (not shown) in conjunction with fasteners 24, 26. A separate vertical post 30 secures to the frame 12 using fasteners 32, 34 and nuts 36, 38. A light mounting 40 secures to the vertical post 30 with fasteners 42, 44, 46, 48. An electrical wire 50 carries electricity to the light mounting 40.

What is needed then is a device that does not suffer from the above limitations. This, in turn, will provide a rust-proof, lightweight, unitary device manufactured with no scrap material.

SUMMARY

A spare tire carrier for a vehicle may be cast as a single unitary piece having a base that defines four petals, each petal having a protruding mounting flange that extends such that a surface of the flanges mount flush with a vehicle outer body, such as a tailgate. Extending from the base is a vertical support post within which a light support post attaches, while a tether, which may be a separate, bent material in the form of a strap, may be confined to an interior volume or space of the base. To provide electrical power to bulbs of a stop lamp within a receptacle of the light support post, an electrical cable or wiring harness leads from the light receptacle, into the confines of the base, and into the tailgate of the vehicle.

A first and a second bolt, also known as studs, may pass through the tether and the front surface of the base when the spare tire carrier is in its mounted position on a vehicle. A threaded stud may be turned into a front surface of the base to secure the stud within the base. Together the stud and first and second bolts form a triangular arrangement that matches mounting holes of a wheel of a spare tire. Casting the spare tire carrier from magnesium while insulating contact surfaces to prevent galvanic corrosion ensures a rust-free part that may be manufactured with little or no assembly or any resulting scrap material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
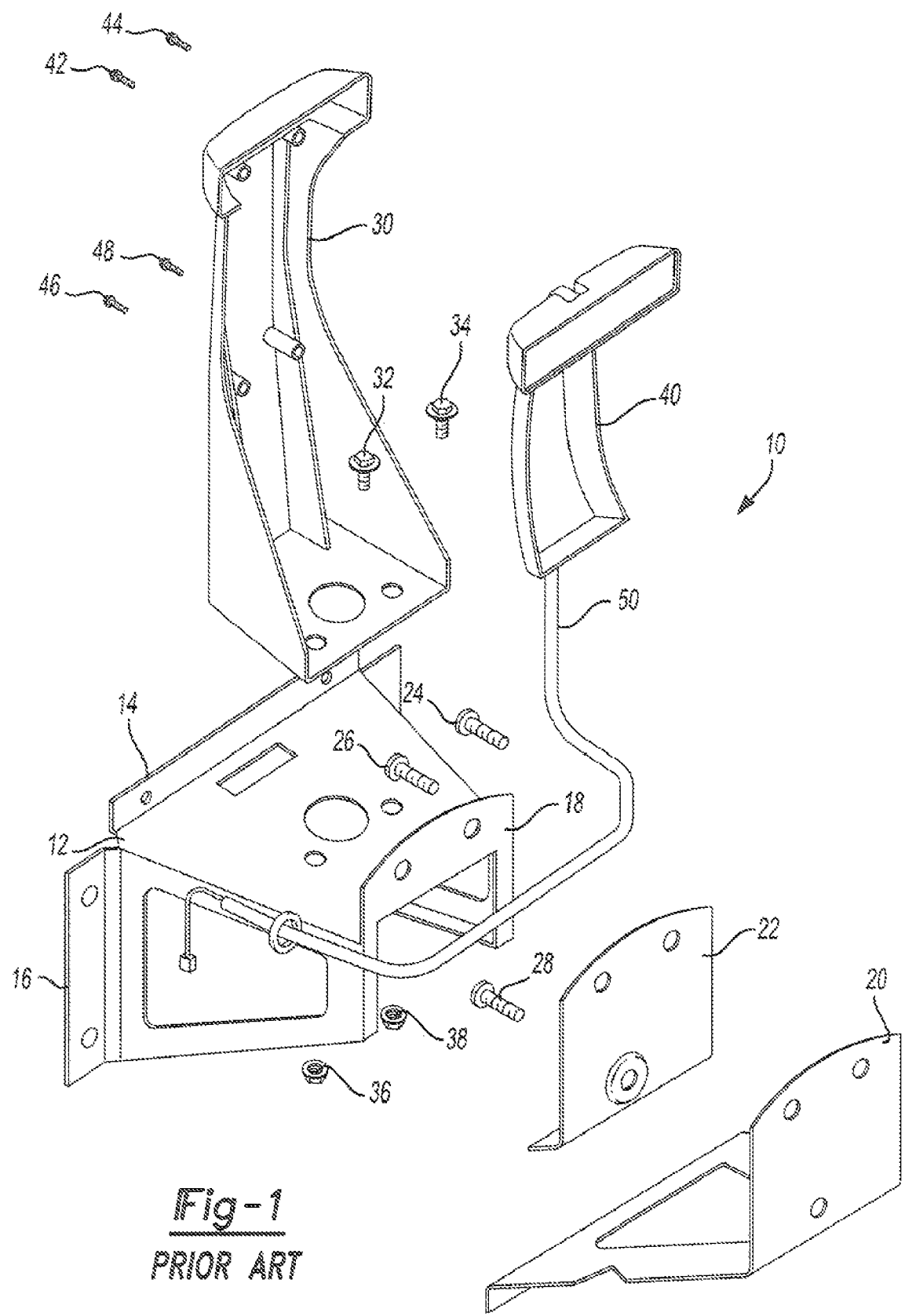
FIG. 1 is an exploded view of a prior art spare tire carrier.
Figure 2:
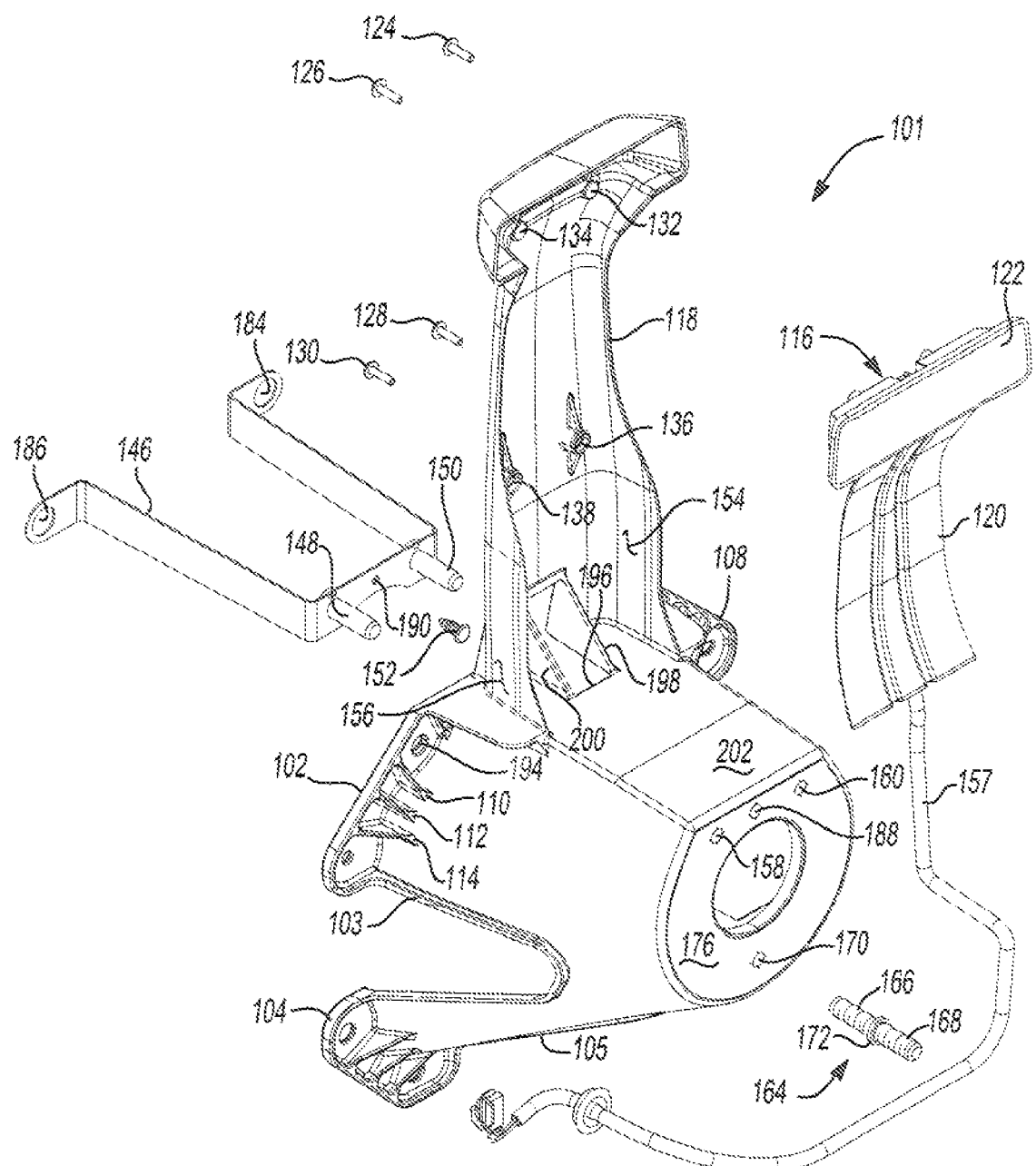
FIG. 2 is a left perspective assembly view of a spare tire carrier arranged in accordance with the disclosed teachings.

The following description of the preferred embodiments is merely exemplary in nature and is in no way intended to limit the invention, its application, or uses. Turning first to FIG. 2, and with auxiliary reference to FIGS. 3 and 4, a base 100 of a spare tire carrier 101 protrudes from four flanges, a first flange 102, a second flange 104, a third flange 106 (FIG. 5) and a fourth flange 108. The flanges 102, 104, 106, 108 are individually located at the ends of what may be described as lobes or petals 103, 105, 107, 109 of the base 100 and define the confines of the base 100 along with the top surface 202, which may be flat, and the front surface 176, which may also be flat, because it is the mounting surface for a wheel of a spare tire. Generally, the confines of the base 100 is the interior volume or space of the base 100 bounded by the petals 103, 105, 107, 108, top surface 202 and front surface 176. Additionally, the flanges 102, 104, 106, 108 are cast perpendicular or approximately perpendicular to a centerline of the base 100. The centerline of the base 100 may be a line that is perpendicular to the tailgate 142 (FIG. 6) and that passes through the center of the circular hole 204 in the front surface 176 of the base 100. Generally, the base 100 has such petals 103, 105, 107, 109, as compared to a solid cylinder, to permit a reduction in the overall weight of the base 100 and thus, the spare tire carrier 101.

As depicted in FIGS. 2-5, only the flanges 102, 104, 106, 108 of the base contact the vehicle 140 for mounting purposes because of the non-existence of material between the petals, which results in a weight savings; however, the spare tire carrier 101 is sufficiently strong to support the weight of a wheel 162 and tire 144, which may be approximately 75 pounds. To provide strength at the juncture of the base 100 and the flanges, using flange 102 as an example, strength ribs 110, 112, and 114 are molded in place between the petal 103 and the flange 102. A similar multiple-rib structure is provided at the juncture of each of the remaining flanges 104, 106, 108 and corresponding petals 105, 107, 109 of the base 100. The strength ribs 110, 112, 114 are angled so as to promote the evacuation or draining of water and other liquid substances, such as mud, from the rib-strengthened area, such as may otherwise accumulate during rainfall, washing, or four-wheeling, as the vehicle depicted in FIG. 6 is a sport-utility vehicle suitable for off road use.

Figure 3:
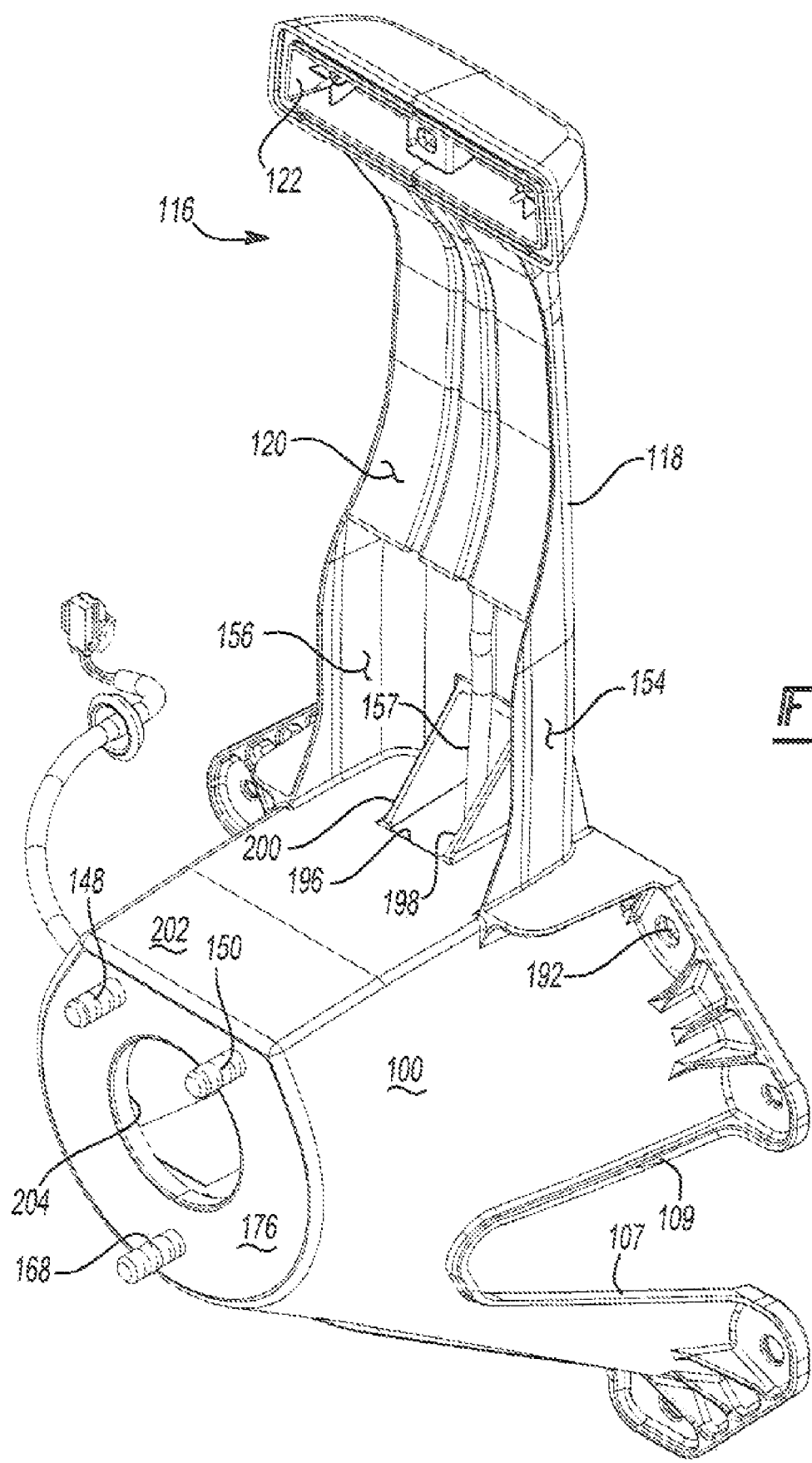
FIG. 3 is a right perspective view of a spare tire carrier arranged in accordance with the disclosed teachings.
Figure 4:
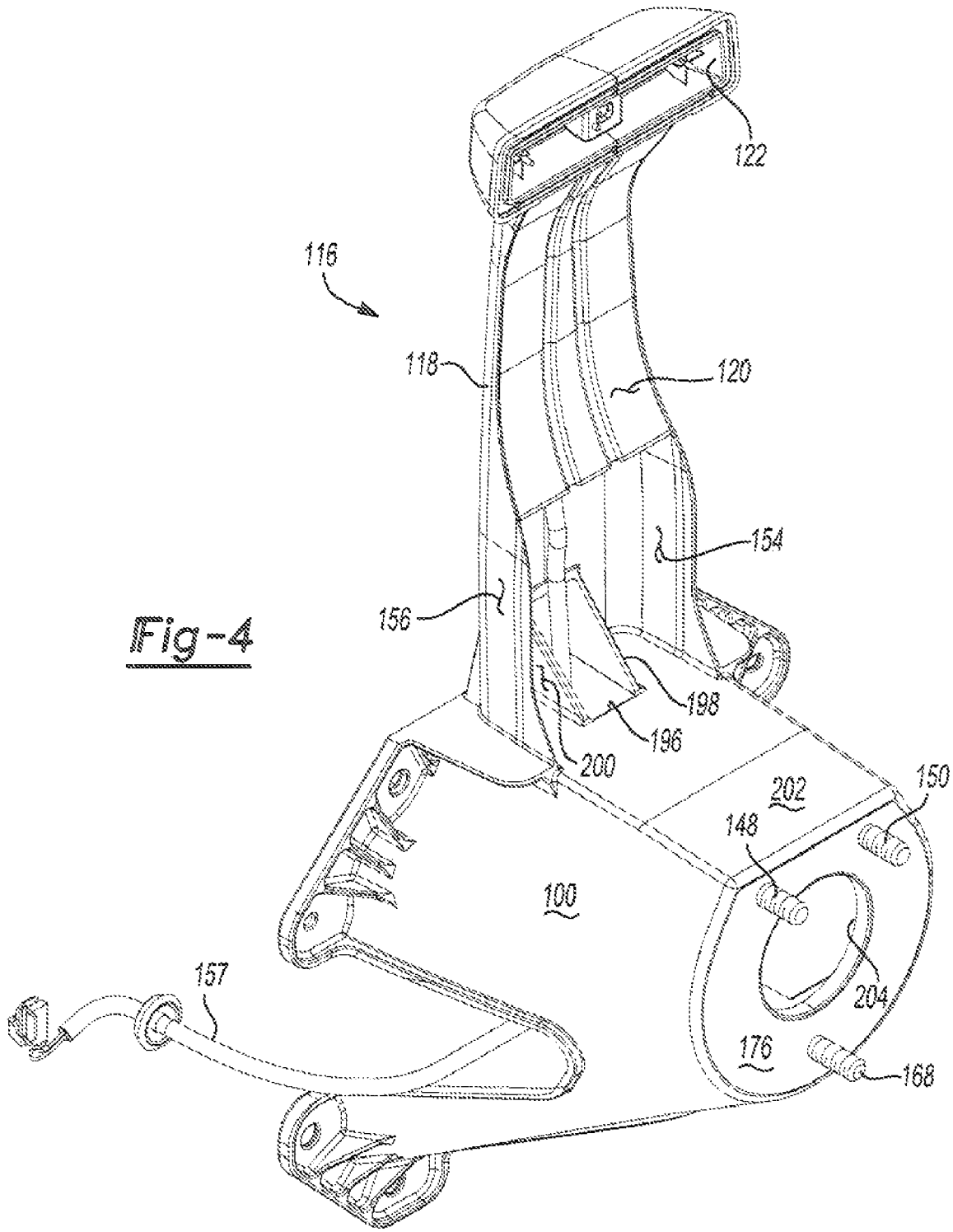
FIG. 4 is a left perspective view of the spare tire carrier arranged in accordance with the disclosed teachings.

Continuing with FIG. 2, further details of the spare tire carrier 101 will be explained. From the base 100, a vertical support post 118 protrudes within which a Center High Mounted Stop Lamp or "CHMSL" Assembly 116 resides (FIG. 3). The vertical support post 118 is cast so as to protrude in a substantially vertical or vertical direction from the base 100. The CHMSL assembly 116 is generally composed of two major parts. The first part is a light support post 120 and the second part is a light receptacle 122. The vertical support post 118 is integrally formed with the base 100 while the light support post 120 is a separate part, such as a plastic part, that is fitted into the vertical support post 118 and is secured with fasteners. At the top of the light post 120 is a light receptacle 122 that houses light bulbs, an LED or another illumination device that functions as a stop lamp, also know as a brake light. The light receptacle 122 may be integrally molded with the light support post 120 such that the fight support post 120 and receptacle 122 may be secured to the vertical support post 118 with fasteners 124, 126, 128, 130 that may engage the light support post 120 with threads. Such fasteners may pass through holes 132, 134, 136, 138.

Figure 6:
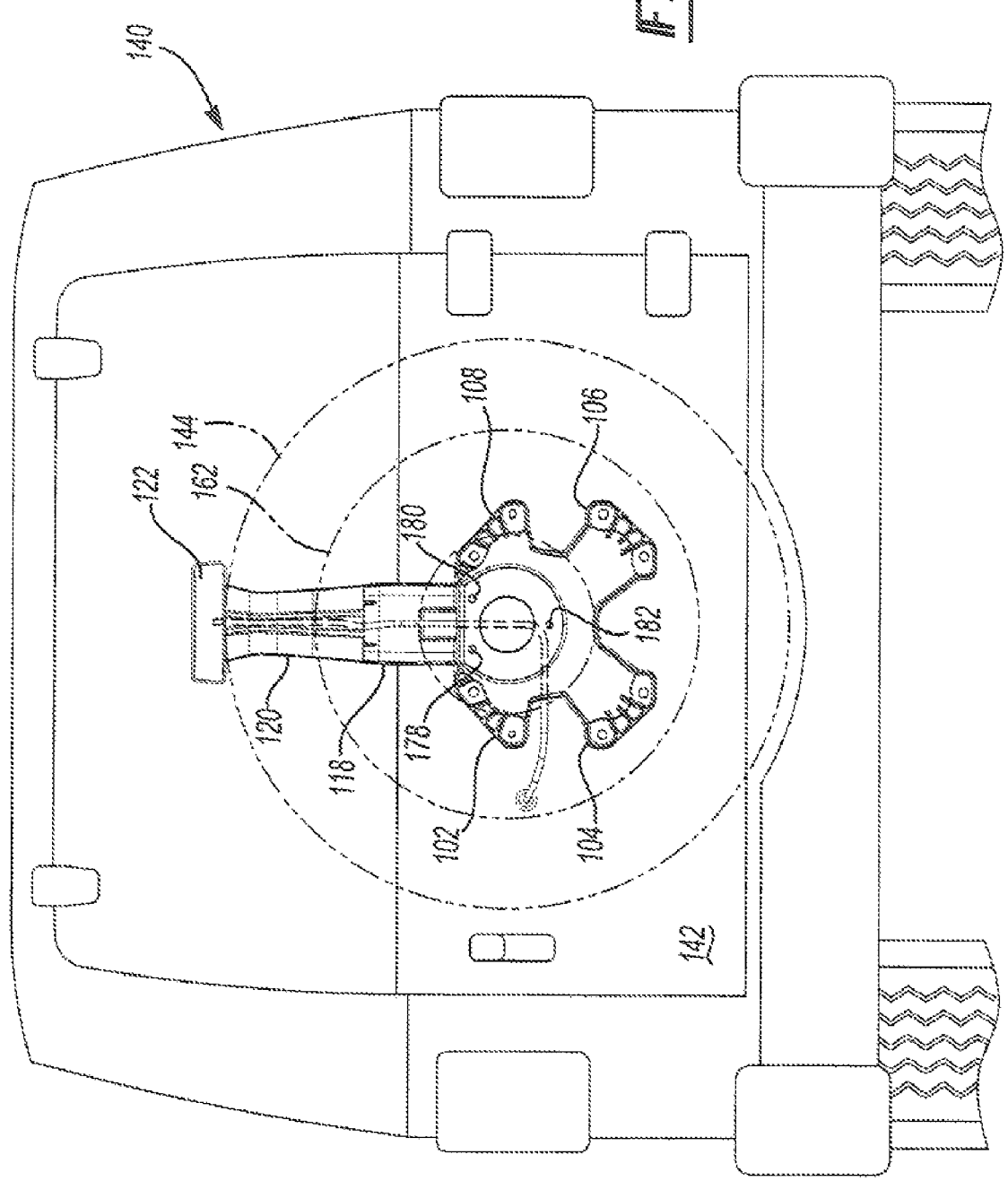
FIG. 6 is a rear view of a vehicle depicting a mounting location of the spare tire carrier according to the disclosed teachings.

As depicted in FIG. 6, when the light support post 120 is mounted within the vertical support post 118, and the base 100 is mounted to an exterior of a vehicle 140, such as to a rear tailgate 142, the light receptacle 122 is visible from a rear area of the vehicle 140, such that the stop lamps may be seen above a tire 144 by an occupant of a rearward-following vehicle when a brake pedal of the vehicle 140 is pressed, which results in illumination of the stop lamp.

Returning reference to FIG. 2, further details will be explained. Just below the vertical support post 118, with its strength-providing sides 154, 156, which also provide protection for an electrical cable 157, a tether, in the form of a tether bracket 146, inserts into the rear of the base 100. More specifically, the tether 146 is, as depicted, generally in the shape of a "U" with a first bolt 148 or tether stud and a second bolt 150 or tether stud that pass through a first hole 158 and a second hole 160, respectively. Together, the first and second bolts 148, 150 assist in securing the wheel portion 162 (FIG. 6) of the spare tire to the vehicle 140. A third securing member, a threaded stud 164, which has threads on a first stud end 166 and a second stud end 168, also assist in securing the wheel 162 to the base 100. More specifically, the first threaded stud end 166 is inserted into the hole 170 by turning such that the threads of the first stud end 166 engage wail material of the hole 170 and securely hold the stud 164 within the hole 170 up to a stud collar 172. The threaded stud secures into the front surface 176 of the base 100 to a depth less than a frontal wall thickness, that is, the stud does not protrude from the rear side of the base and thus does not interfere with the tether 146.

The threaded stud 164 forms a triangular arrangement with the first and second bolts 148, 150. By engaging the wall material of the hole with threads of the first threaded stud end 166, a water resistant seal is formed between the first stud end 166 and the material within the hole 170. Together, the first bolt 148, second bolt 150 and stud 164 form a triangular mounting pattern that matches corresponding holes of a standard wheel 162 of the spare tire 144.

Figure 5:
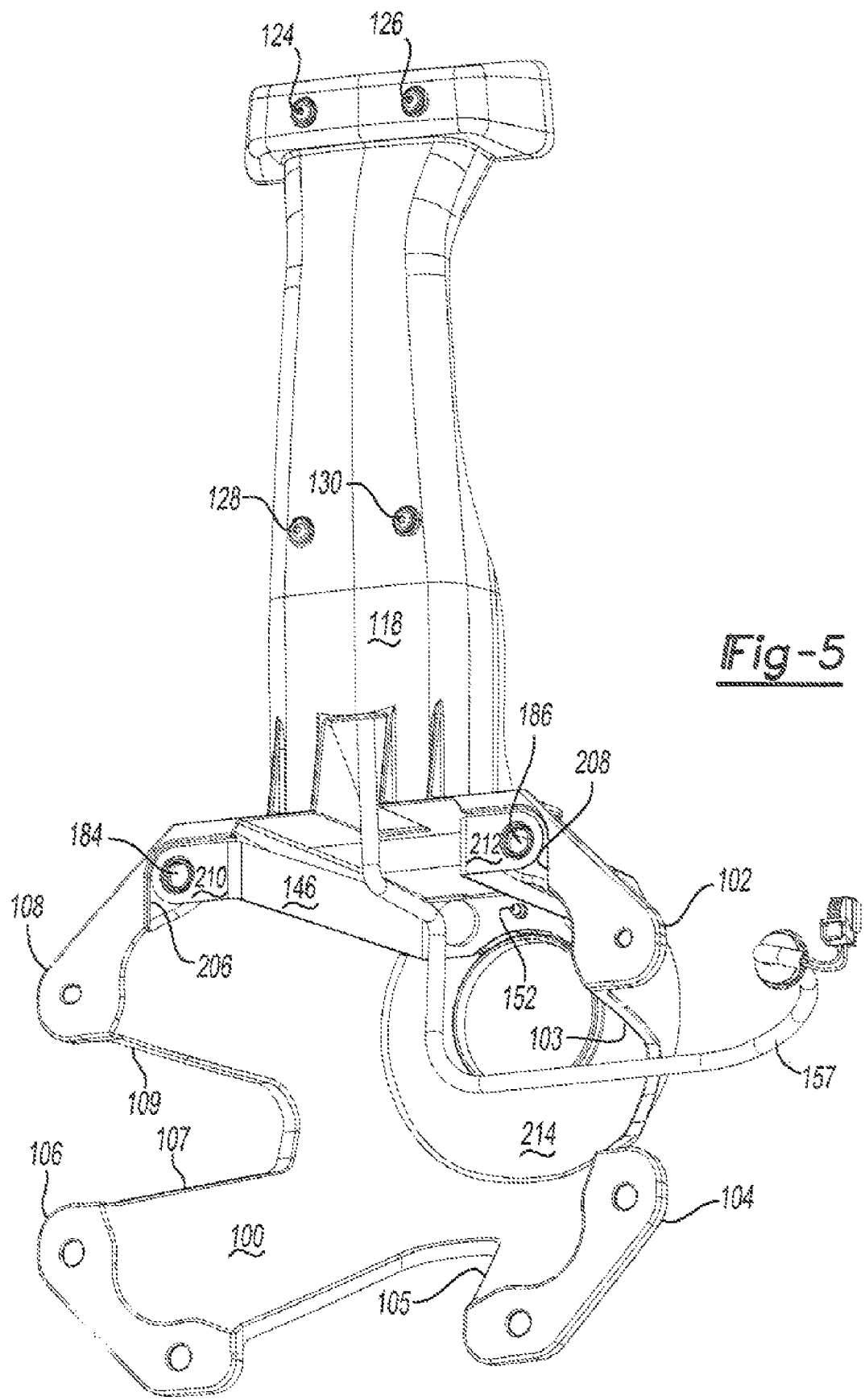
FIG. 5 is a rear perspective view of the spare tire carrier arranged in accordance with the disclosed teachings.

With reference to FIG. 5, when the tether 146 is in place within the base 100, it is secured, in part, against the rear surface 174 of the base front area such that the bolts 148, 150 protrude through holes 184, 186 in the tether and the holes 158, 160 in the front surface 176. With the bolts 148, 150 and stud 168 protruding from the front surface 176, the wheel 162 and tire 144, collectively and generally known as a "spare tire," may be secured to the spare tire carrier 101. A standard wheel to be secured against the surface 176 has five holes; three of such five holes depicted as holes 178, 180 and 182 may be utilized to secure the wheel 162 against the surface 176 as depicted in FIG. 6.

Continuing with FIG. 5 and the tether 146, a tether fastener 152 may be used to secure the tether 146 in place within the confines of the base 100 for mounting of the base 100 to a vehicle 140. The tether fastener 152, which may be threaded, may be driven into the hole 188 from an exterior of the base 100 and into the surface 176 such that the fastener 152 passes from the rear side, or interior surface of the base 100 and info the hole 190 of the tether 146. When secured in place, the holes 184, 186 of the tether 146 match or align with holes 192, 194 of the base 100 such that fasteners, such as bolts, may be passed through the holes 184, 192 and 186, 194 to attach the spare tire carrier 101 to a vehicle 140. Continuing with FIG. 5, one can determine that the base 100 is deeper than the tether 146. Accordingly, FIG. 5 depicts a first recession 206 and a second recession 208 within which a first tab 210 and a second tab 212 of the tether 146 reside. With the tether tabs 210, 212 situated in the recessions 206, 208, and the tether abutting an interior front surface 214 of the base 100, it can be seen that the effective length of the tether 146 is slightly less than the depth of the base 100, thus the tether is generally concealed from the view of an observer and completely confined within the base, that is confined within the volume defined by the petals 103, 105, 107, 109, top surface 202, and front surface 176. Finally, it is the depth of the base 100 from the vertical support post 118 to the front surface 176 that generally governs the maximum depth of a wheel that may be mounted on the spare tire carrier 101.

The tether 146 brings advantages. First, the tether 146 provides added security that the spare tire will remain attached to the vehicle, up to the length of the tether 146, in the event the magnesium casting becomes cracked or broken due to extreme impact forces. Because the tether 146 is made of a flexible material, such as steel, it is flexible and bendable such that it may flex or bend into a variety of shapes should the need arise, such as if the rear of the vehicle 140 is struck in a collision and the tall gate 142 bends or becomes deformed, thus changing the position of the spare tire and base 100.

With reference to FIG. 2, when the light support post 120 is installed against and within the vertical support post 118 with fasteners 124, 126, 128, 130, the electrical cord or wiring harness 157 is positioned through an opening or aperture 196 between the support ribs or support walls 198, 200 that join or connect the vertical support post 118 and the base 100. The support walls 198, 200 provide support by increasing the moment of inertia of the vertical support post 118, relative to the base 100. Like the vertical support post 118, the flanges 102, 104, 106, 108, and support or strength ribs 110, 112, 114, as one example, between the flanges 102, 104, 106, 108 and petals 103, 105, 107, 109, the support walls 198, 200 are integrally cast of the same material, such as magnesium. There are multiple advantages of using not only a casting, but cast magnesium, as the material for the spare tire carrier 101, excluding the plastic light support post 120 and receptacle 122. First, magnesium is a low-density, structural material, which makes it light weight when compared to other structural materials, such as sheet aluminum or sheet steel, given the same volume of material used in construction. Additionally, by manufacturing the spare tire carrier 101 as a cast part, all stamping, bending, welding, and fastening of multiple parts, as required by the prior art, are eliminated. Finally, magnesium is a non-rusting material.

The foregoing description is merely exemplary in nature and, thus, variations that do not depart from the gist of the invention are intended to be within the scope of the invention. Such variations are not to be regarded as a departure from the spirit and scope of the invention.

What is claimed is:

1. A spare tire carrier for a vehicle, the spare tire carrier comprising:
   a base;
   a first mounting flange extending from the base;
   a vertical support post extending from the base;
   a light support post attached to the vertical support post;
   a threaded stud, the threaded stud engaging a front surface of the base to support a spare tire;
   a tether attached to the base; and
   a plurality of strength ribs joining the first mounting flange and the base, wherein the base, the first mounting flange, and vertical support post extending from the base, and plurality of strength ribs are a single cast magnesium part.

2. The spare tire carrier of claim 1, further comprising:
   a first bolt; and
   a second bolt, the first and second bolts passing through the tether and a front surface of the base to support a spare tire in conjunction with the threaded stud.

3. The spare tire carrier of claim 1, further comprising a tether within confines of the base.

4. The spare tire carrier of claim 1, further comprising:
   a tether; and
   a tether fastener, wherein the tether fastener secures the tether to the base.

5. The spare tire carrier of claim 1, further comprising:
   a first tether stud;
   a second tether stud; and
   a tether, wherein the tether is connected to the vehicle and the tether studs pass through the tether and the base.

6. The spare tire carrier of claim 5, wherein the tether studs protrude through the front surface of the base.

7. The spare tire carrier of claim 6, wherein the tether is located completely within the confines of the base.

8. The spare tire carrier of claim 1, wherein the base is deeper than a length of the tether.

9. A spare tire carrier for a vehicle, the spare tire carrier comprising:
   a base;
   a first mounting flange extending from the base;
   a vertical support post extending from the base;
   a light support post attached to the vertical support post; and
   a tether, the tether confined within an interior volume of the base;
   a first bolt and a second bolt, wherein the first and second bolts pass through the tether and the base and wherein the first and second bolts pass through a front surface of the base; and
   a threaded stud, wherein the threaded stud secures into a front surface of the base to a depth less than a frontal wall thickness and forms a triangular arrangement with the first and second bolts, wherein the threaded stud and the first and second bolts match a triangular hole pattern of a wheel.

10. The spare tire carrier of claim 9, further comprising:
    a second, third and fourth mounting flange extending from the base, wherein the flanges are part of separate petals of the base.

11. The spare tire carrier of claim 10, wherein the base, first, second, third and fourth mounting flanges extending from the base, and the vertical support post extending from the base are an integral casting.

12. A spare tire carrier for a vehicle, the spare tire carrier comprising:
    a base;
    a plurality of mounting flanges extending from the base;
    a vertical support post extending from the base;
    a light support post attached to the vertical support post, wherein the base, mounting flanges and vertical support post are a single integrally cast piece;
    a first tether stud;
    a second tether stud; and
    a tether, where the first and second tether studs pass through the tether and the base and the tether is substantially concealed within an interior volume of the base.

13. The spare tire carrier of claim 12, wherein the flanges project perpendicular to a centerline of the base.

14. The spare tire carrier of claim 13, wherein the base further comprises a flat, front surface that lies farther from the mounting flanges than the tether.

* * * * *